United States Patent
Yamasaki

(10) Patent No.: US 10,257,372 B2
(45) Date of Patent: Apr. 9, 2019

(54) COLOR MEASUREMENT SYSTEM, IMAGE GENERATING APPARATUS, AND NON-TRANSITORY COMPUTER READABLE MEDIUM FOR PERFORMING COLOR MEASUREMENT ON AN IMAGE DISPLAYED IN AN AUGMENTED REALITY SPACE

(71) Applicant: FUJI XEROX CO., LTD., Tokyo (JP)

(72) Inventor: Naoto Yamasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 46 days.

(21) Appl. No.: 15/443,204

(22) Filed: Feb. 27, 2017

(65) Prior Publication Data

US 2018/0027132 A1    Jan. 25, 2018

(30) Foreign Application Priority Data

Jul. 25, 2016    (JP) .................................. 2016-145515

(51) Int. Cl.
*H04N 1/00* (2006.01)
*G06T 11/60* (2006.01)

(52) U.S. Cl.
CPC ......... *H04N 1/00408* (2013.01); *G06T 11/60* (2013.01); *H04N 1/00015* (2013.01); *H04N 1/00023* (2013.01); *H04N 1/00034* (2013.01); *H04N 1/00045* (2013.01); *H04N 1/00087* (2013.01)

(58) Field of Classification Search
None
See application file for complete search history.

(56) References Cited

U.S. PATENT DOCUMENTS

2002/0065843 A1*  5/2002  Sharma .................. G06K 15/00
                                                              715/234
2017/0323449 A1* 11/2017  Aonuma ............... G06T 19/006

FOREIGN PATENT DOCUMENTS

JP          2011-043875 A        3/2011

* cited by examiner

*Primary Examiner* — Andrew H Lam
(74) *Attorney, Agent, or Firm* — Oliff PLC

(57) ABSTRACT

A color measurement system includes a display that presents to a user an augmented reality space that results from combining a display image into a real space, and an image generating unit that generates the display image that is obtained when the user views through the display a medium having thereon a color measurement target image on which color measurement is to be performed. The display image includes information indicating a location of the color measurement target image.

20 Claims, 10 Drawing Sheets

COLOR MEASUREMENT SYSTEM, IMAGE GENERATING APPARATUS, AND NON-TRANSITORY COMPUTER READABLE MEDIUM FOR PERFORMING COLOR MEASUREMENT ON AN IMAGE DISPLAYED IN AN AUGMENTED REALITY SPACE

CROSS-REFERENCE TO RELATED APPLICATIONS

This application is based on and claims priority under 35 USC 119 from Japanese Patent Application No. 2016-145515 filed Jul. 25, 2016.

BACKGROUND

Technical Field

The present invention relates to a color measurement system, an image generating apparatus, and a non-transitory computer readable medium.

SUMMARY

According to an aspect of the invention, there is provided a color measurement system. The color measurement system includes a display that presents to a user an augmented reality space that results from combining a display image into a real space, and an image generating unit that generates the display image that is obtained when the user views through the display a medium having thereon a color measurement target image on which color measurement is to be performed. The display image includes information indicating a location of the color measurement target image.

BRIEF DESCRIPTION OF THE DRAWINGS

Exemplary embodiment of the present invention will be described in detail based on the following figures, wherein.

DETAILED DESCRIPTION

An exemplary embodiment of the present invention is described in detail with reference to the drawings.

Figure 1:
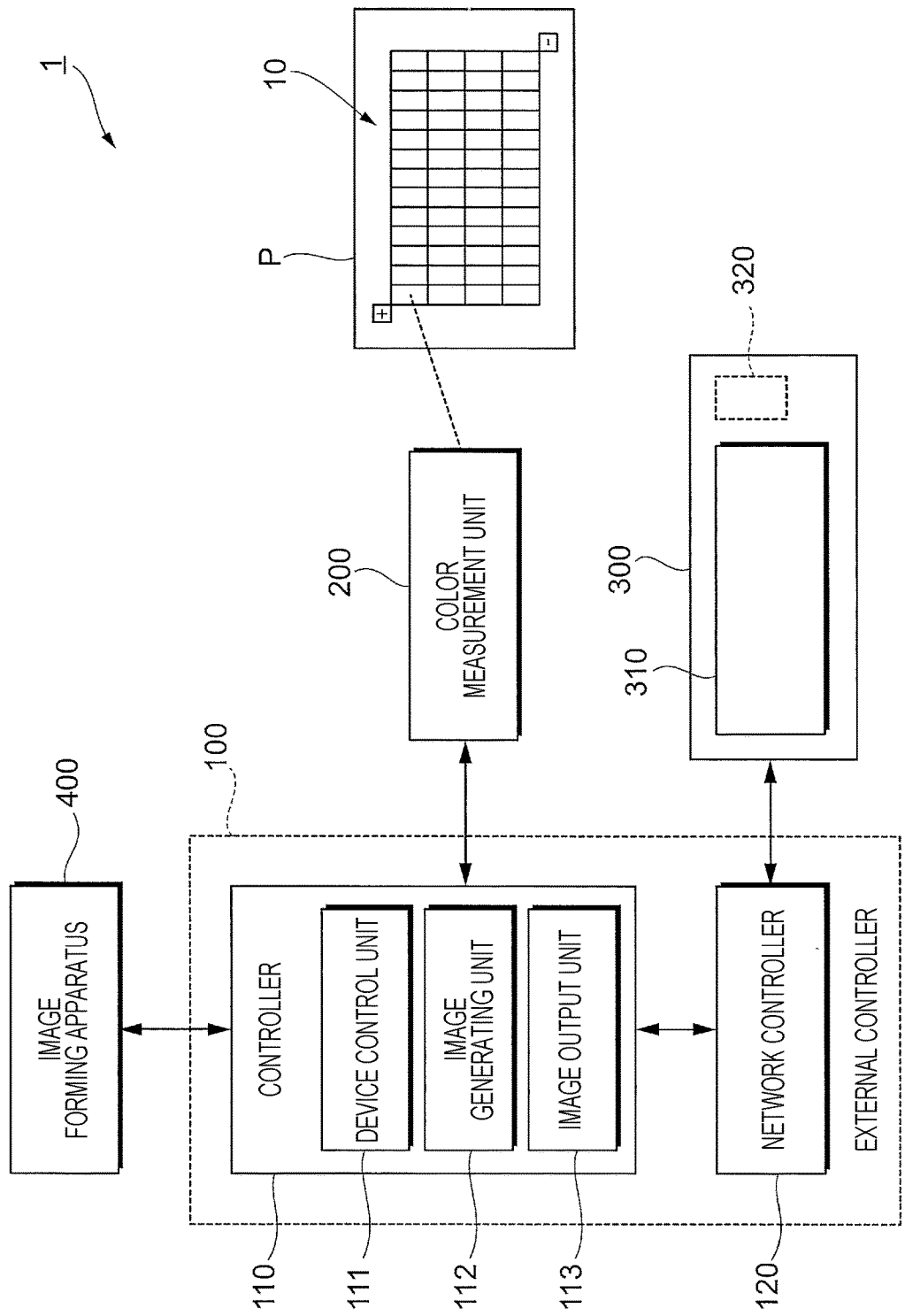
FIG. 1 generally illustrates a color measurement system.

FIG. 1 generally illustrates a color measurement system 1.

The color measurement system 1 of the exemplary embodiment includes a color measurement unit 200 that measures a color of a chart image 10 formed on a chart paper sheet P. The chart paper sheet P is a paper sheet serving as an example of a medium and having the color chart image 10 formed thereon.

The color measurement system 1 further includes an augmented reality (AR) display apparatus 300 that presents to a user an augmented reality space that results from combining a display image into a real space. The color measurement system 1 further includes an external controller 100 that connects to a color measurement unit 200 and the AR display apparatus 300.

The AR display apparatus 300 serving as an example of a display apparatus includes a mobile terminal that is portable. The AR display apparatus 300 includes a camera 320 having a charge-coupled device (CCD). The camera 320 serving as an example of an imaging device photographs the surrounding environment of the AR display apparatus 300.

The AR display apparatus 300 also includes a display 310. The display 310 serving as an image display unit displays a display image.

In accordance with the exemplary embodiment, an image captured by the camera 320 is displayed on the display 310.

In accordance with the exemplary embodiment, if the user views the chart paper sheet P through the AR display apparatus 300, a composite image is displayed on the AR display apparatus 300. The composite image is a combination of the image that results from imaging the chart paper sheet P (an image of the real space), and another image (an image generated by the external controller 100). The user views the augmented reality space through the AR display apparatus 300.

In other words, the AR display apparatus 300 of the exemplary embodiment generates the composite image into which the image of the real space (captured image) and the display image are combined, and the composite image is displayed on the display 310. The user thus views the augmented reality space by viewing the composite image.

The AR display apparatus 300 may be an AR display apparatus that displays an image on a light-transmissive display 310. In such a case, the user views the real space through the light-transmissive display 310. In other words, if the user views the display 310 from the front side thereof, the user sees through the display 310 the real space present behind the display 310. The user thus recognizes through the display 310 the real space present behind the display 310. The user also views a display image displayed on the display 310 together with the real space.

The AR display apparatus 300 may be a head-mount type AR display apparatus as a dedicated device, or a tablet terminal, or a smart phone.

The color measurement unit 200, when operated by the user, moves on the chart paper sheet P.

The color measurement unit 200 measures a color of the chart image 10 serving as an example of a color measurement target image. More specifically, the color measurement unit 200 reads the chart image 10 formed on the chart paper sheet P, thereby measuring the color of the chart image 10. The measurement results provided by the color measurement unit 200 are output to the external controller 100.

The external controller 100 may be a personal computer (PC). The external controller 100 is connected to the color measurement unit 200 and the AR display apparatus 300.

The external controller 100 and the color measurement unit 200 may be connected to each other via a universal serial bus (USB). The external controller 100 and the AR display apparatus 300 may be connected to each other via a radio communication line, such as Wi-Fi, or Bluetooth (registered trademark).

Figure 2:
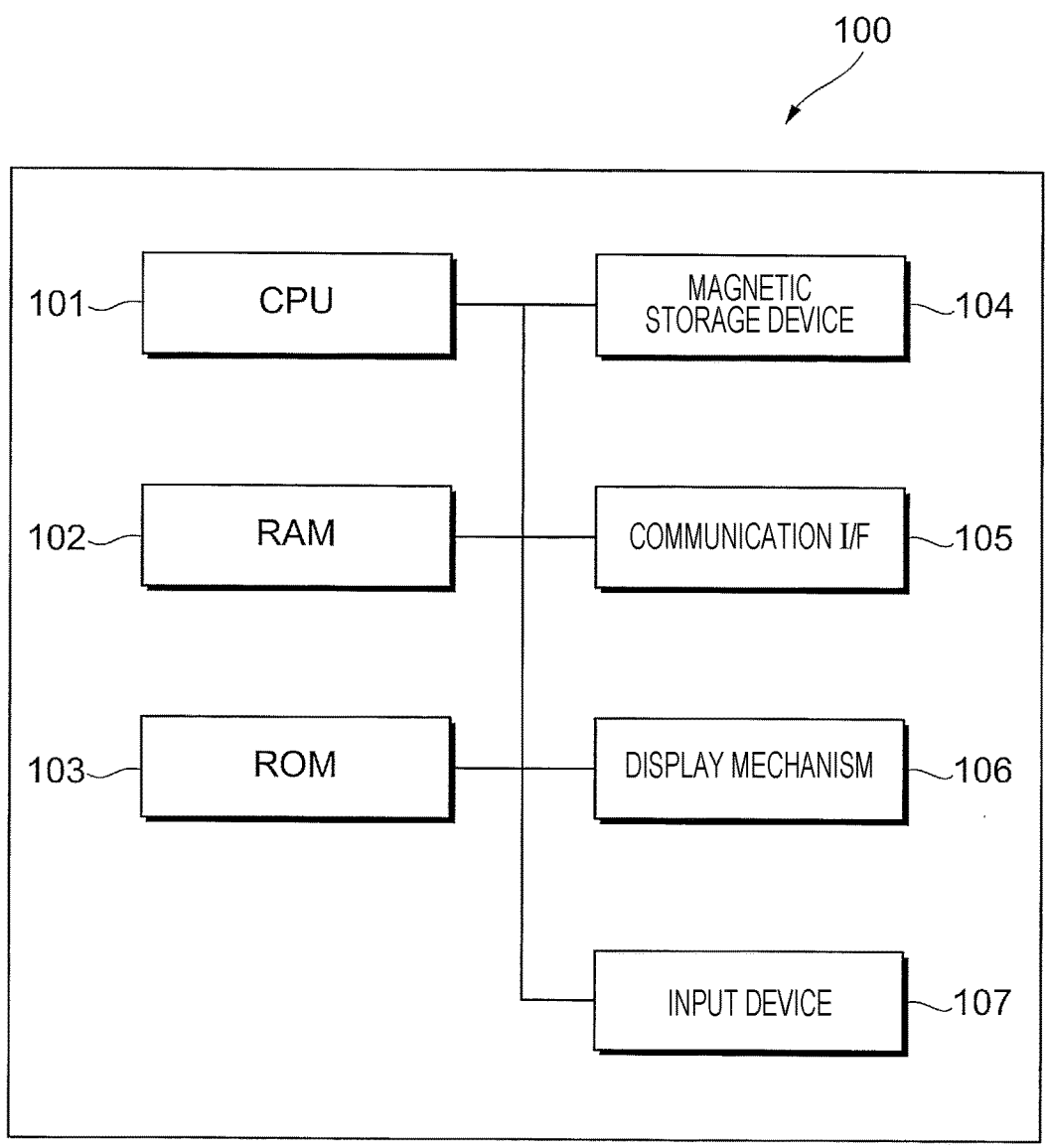
FIG. 2 illustrates a hardware configuration of an external controller.

FIG. 2 illustrates a hardware configuration of the external controller 100.

Referring to FIG. 2, the external controller 100 includes a central processing unit (CPU) 101, a random-access memory (RAM) 102, a read-only memory (ROM) 103, and a magnetic storage device 104.

The external controller 100 further includes a communication interface (I/F) 105 to communicate with the outside, a display mechanism 106, and an input device 107, such as a keyboard or a mouse.

Each of the ROM 103, and the magnetic storage device 104 stores programs to be executed by the CPU 101. The CPU 101 reads the programs stored on the ROM 103 or the magnetic storage device 104, and executes the programs using the RAM 102 as a work area.

When the CPU 101 executes the programs stored on the ROM 103 or the magnetic storage device 104, the external controller 100 functions as a controller 110 and a network controller 120 as illustrated in FIG. 1.

The controller 110 controls the color measurement unit 200 and the AR display apparatus 300. The network controller 120 controls communication between the AR display apparatus 300 and the external controller 100, and communication between the color measurement unit 200 and the external controller 100.

The programs to be executed by the CPU 101 may be provided to the external controller 100 in a recorded state on one of computer readable recording media. The computer readable recording media include a magnetic recording medium (such as a magnetic tape or a magnetic disk), an optical recording medium (such as an optical disk), a magnetic optical recording medium, and a semiconductor memory.

The program to be executed by the CPU 101 may be downloaded to the external controller 100 via a communication network, such as the Internet.

Referring to FIG. 1, the controller 110 includes a device control unit 111 that controls the color measurement unit 200 and the AR display apparatus 300.

The controller 110 further includes an image generating unit 112 serving as an example of an image generation unit, and an image output unit 113 serving as an example of an output unit.

The image generating unit 112 generates a display image to be displayed on the display 310 in the AR display apparatus 300. The image output unit 113 controls the communication I/F 105 (see FIG. 2) to output the display image generated by the image generating unit 112 to the AR display apparatus 300.

In accordance with the exemplary embodiment, a section including the image generating unit 112 and the image output unit 113 may be understood as an image generating apparatus that generates and outputs the display image.

In accordance with the exemplary embodiment, the color measurement system 1 includes an image forming apparatus 400 that performs image forming on a paper sheet serving as an example of a medium as illustrated in FIG. 1. The image forming apparatus 400 forms an image on a paper sheet in accordance with the electrophotographic system or the inkjet system.

If a calibration process is performed, the image forming apparatus 400 forms the chart image 10 on the paper sheet, and then discharges the chart paper sheet P. The calibration process is intended to correct the output results of the image forming apparatus 400 to an expected value.

In the calibration process, the color measurement unit 200 measures a color of the chart image 10 on the chart paper sheet P discharged from the image forming apparatus 400. A correction parameter is generated in response to a difference between a color measurement value provided by the color measurement unit 200 and a predetermined expected value.

The image forming apparatus 400 performs an adjustment process using the correction parameter. In this way, the output results of the image forming apparatus 400 are set to be closer to the expected value.

When the chart paper sheet P is discharged from the image forming apparatus 400 in the exemplary embodiment, information concerning the chart paper sheet P (hereinafter referred to as "chart information") is output from the image forming apparatus 400 to the external controller 100. The controller 110 in the external controller 100 acquires the chart information.

The chart information includes image data which the image formed on the chart paper sheet P originates from, position data of each image formed on the chart paper sheet P (position data of the chart image 10 and position data of a position fixing marker to be described below).

Figure 3:
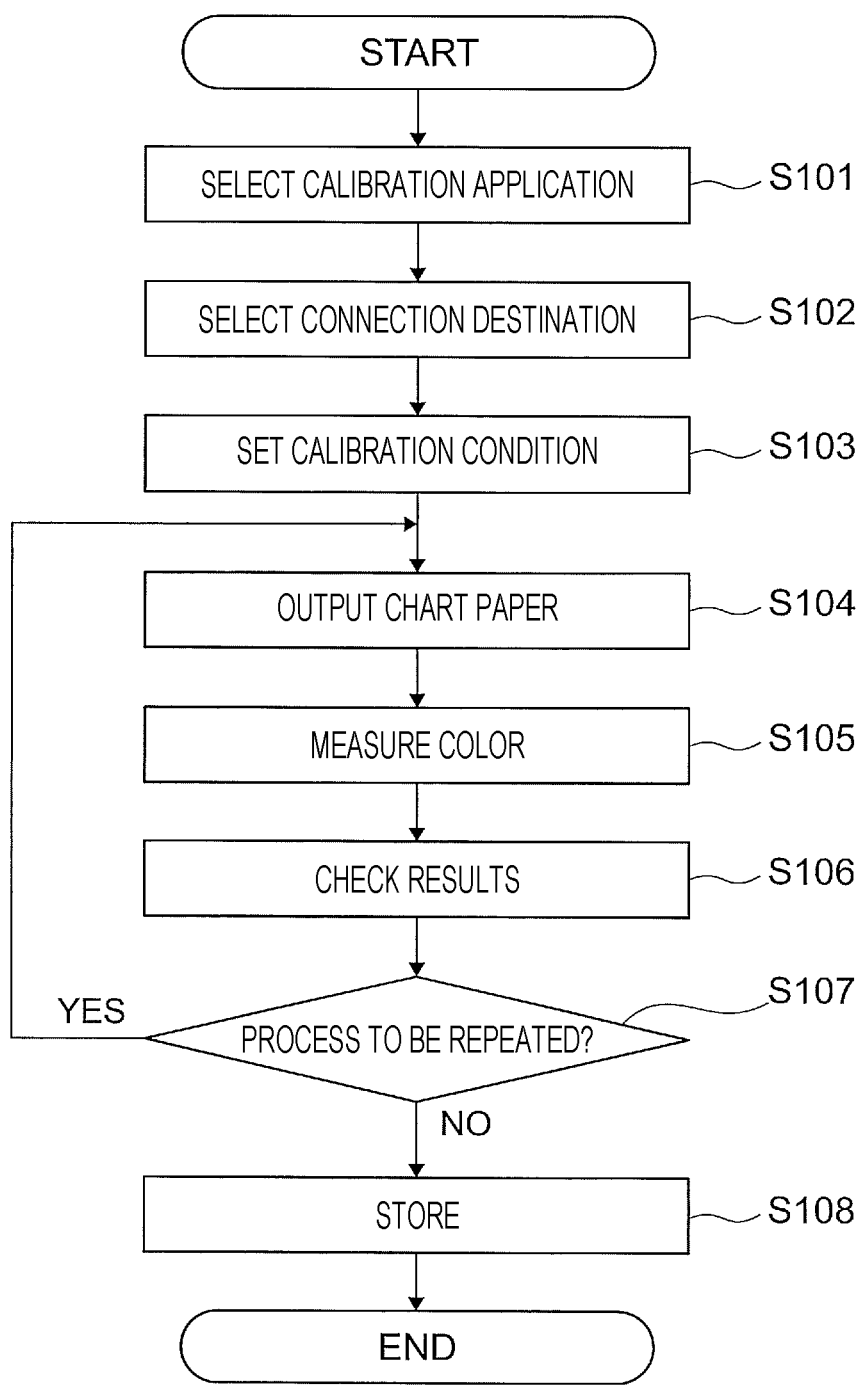
FIG. 3 is a flowchart illustrating a process executed by the color measurement system.

FIG. 3 is a flowchart illustrating a process the color measurement system 1 performs.

In the color measurement system 1 of the exemplary embodiment, the user operates the AR display apparatus 300. The user selects an application for the calibration process on the AR display apparatus 300 (step S101). The user further operates the AR display apparatus 300 to select a connection destination (step S102). In this example, the external controller 100 of FIG. 1 is selected as the connection destination.

The user further operates the AR display apparatus 300 to set a calibration condition (step S103).

The calibration condition includes the type of an original document that is used to generate the chart paper sheet P, and a formation condition of the chart image 10. The calibration condition may further include information as to which of paper trays (not illustrated) of the image forming apparatus 400 is used to feed paper sheets.

A user interface (UI) (not illustrated) of the image forming apparatus 400 and the external controller 100 illustrated in FIG. 1 may be operated to select the application in step S101, to select the connection destination in step S102, and to set the calibration condition in step S103.

The calibration condition is transmitted to the image forming apparatus 400. In response to the calibration condition, the image forming apparatus 400 forms the chart image 10 on the paper sheet, and then discharges the chart paper sheet P (step S104).

When the chart paper sheet P is discharged from the image forming apparatus 400, the chart information is output from the image forming apparatus 400 to the external controller 100. The controller 110 (see FIG. 1) in the external controller 100 acquires the chart information.

The user measures a color of the chart image 10 by operating the color measurement unit 200 (step S105).

The user then wears the AR display apparatus 300. More specifically, if the AR display apparatus 300 is of a type of glasses, the user wears the AR display apparatus 300. If the AR display apparatus 300 is of a tablet terminal type, the user holds the AR display apparatus 300 between the user and the chart paper sheet P, and is in a posture to view the chart paper sheet P through the AR display apparatus 300.

The device control unit 111 in the controller 110 checks the measurement results (step S106). More specifically, based on information from the color measurement unit 200, the device control unit 111 confirms whether the color measurement unit 200 has successfully completed the color measurement process.

In accordance with the exemplary embodiment, the AR display apparatus 300 asks the user whether to repeat the color measurement process (step S107). If a reply from the user is to repeat the color measurement process, step S104 and subsequent steps are repeated.

If the replay from the user is not to repeat the color measurement process, the color measurement results are stored (step S108). In accordance with the exemplary embodiment, the color measurement results are used to generate the correction parameter.

Figure 4A:
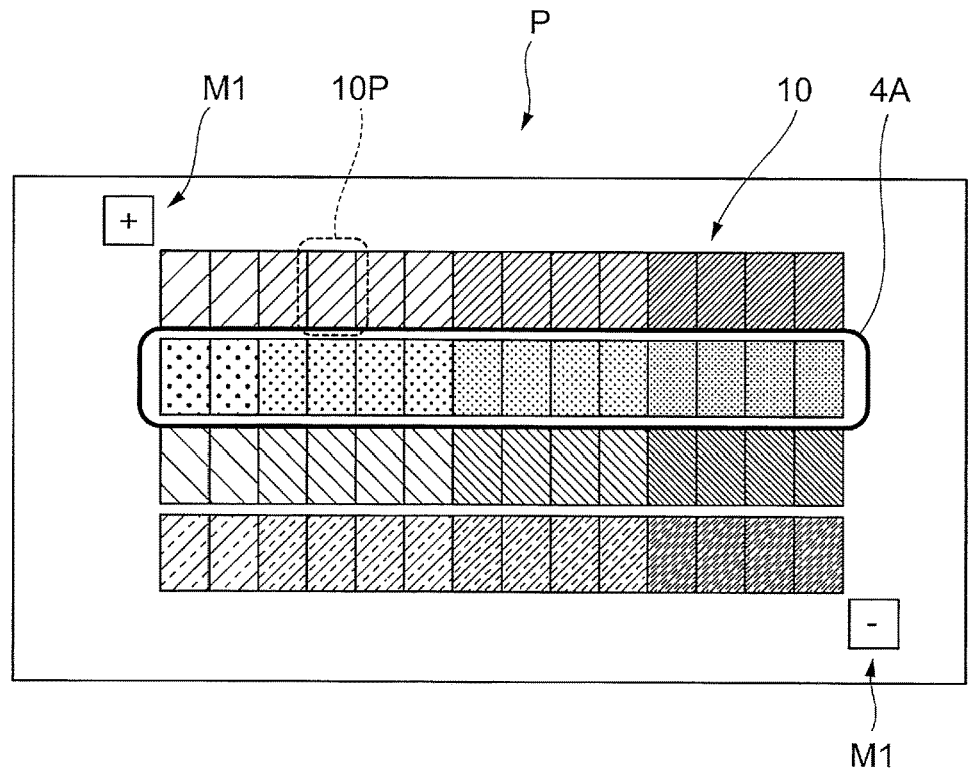
FIG. 4A and FIG. 4B illustrate display images displayed on an AR display when a color measurement process is performed in step S105 of FIG. 3.
Figure 4B:
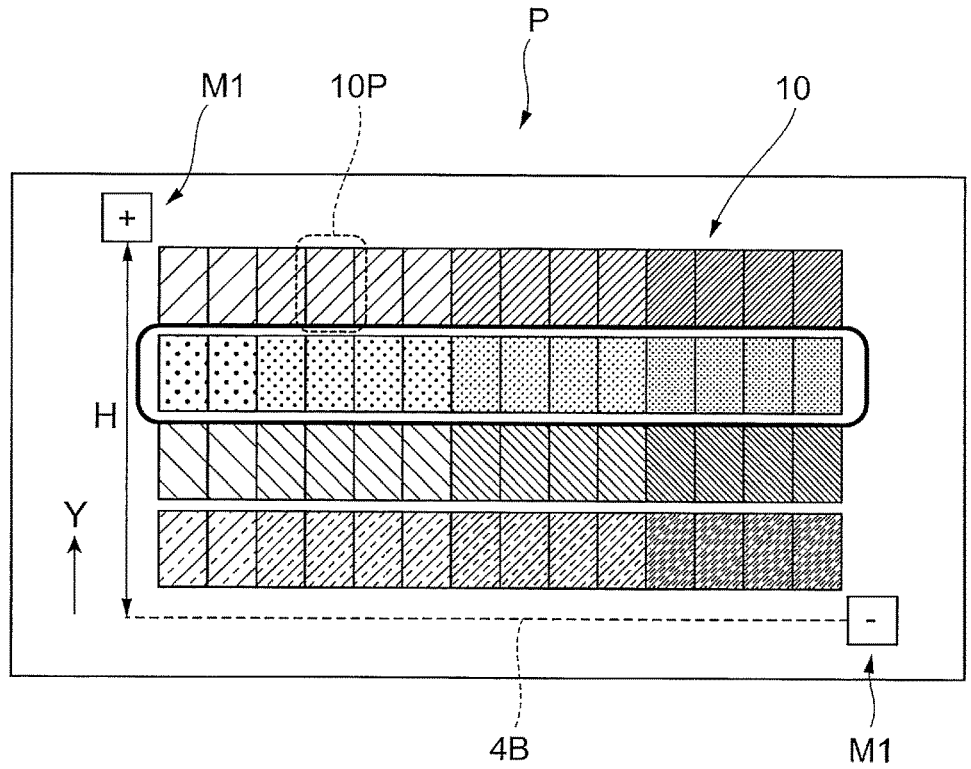

FIG. 4A and FIG. 4B illustrate display images displayed on the AR display apparatus 300 when the color measurement process is performed in step S105 of FIG. 3.

In accordance with the exemplary embodiment, the chart paper sheet P of FIG. 4A is used to perform the calibration process. The chart image 10 is formed on the chart paper sheet P.

The chart image 10 is produced by arraying multiple rectangular patch images 10P in a row direction and a column direction. In other words, the chart image 10 includes multiple rows of chart images 10.

In accordance with the exemplary embodiment, information indicating the location of the chart image 10 that is a color measurement target, for example, a highlight display (rectangular frame) 4A of FIG. 4A is displayed on the display 310 (see FIG. 1) in the AR display apparatus 300.

More specifically, in accordance with the exemplary embodiment, the image generating unit 112 (see FIG. 1) generates a display image including the information indicating the location of the chart image 10 that is a color measurement target (information indicating the location of the chart image 10 that is to be color-measured next), based on the chart information and the results of the previously performed color measurement process.

More specifically, in generating the display image, the image generating unit 112 (see FIG. 1) detects a position fixing marker M1 (see FIG. 4A) from the image captured by the camera 320 in the AR display apparatus 300. Based on the detected position fixing marker M1, the image generating unit 112 determines a location that is to be highlight-displayed.

In accordance with the exemplary embodiment, a positional relationship between the position fixing marker M1 and each chart image 10 (the chart image 10 at each row) is learned by referencing the chart information. Based on the detected position fixing marker M1 and the chart information, the image generating unit 112 fixes the location that is to be highlight-displayed. The image generating unit 112 places the highlight display at the determined location.

In accordance with the exemplary embodiment, the image output unit 113 (see FIG. 1) outputs the display image generated by the image generating unit 112 to the AR display apparatus 300.

The AR display apparatus 300 indicates the location of the chart image 10 that is to be color-measured next. In other words, in the exemplary embodiment, the chart image 10 that is to be color-measured is displayed in an enclosed state as illustrated in FIG. 4A.

FIG. 4A illustrates the display state of the AR display apparatus 300 in which the color measurement of the chart image 10 at the second row is going to be performed with the color measurement of the chart image 10 at the first row completed. In this case, the user recognizes that the chart image 10 at the second row is to be color-measured.

More specifically, in accordance with the exemplary embodiment, the device control unit 111 in the controller 110 (see FIG. 1) determines whether the color measurement of the chart image 10 at each row has been completed. The determination results as to whether the color measurement has been completed are output to the image generating unit 112. In this example, the determination results that the color measurement of the chart image 10 at the first row has been completed are output from the device control unit 111 to the image generating unit 112.

Accordingly, the image generating unit 112 determines that a next color measurement target is the chart image 10 at the second row, and forms the highlight image with the chart image 10 at the second row enclosed by the frame.

FIG. 4B illustrates a determination process to fix the location that is highlight-displayed.

In accordance with the exemplary embodiment, the image generating unit 112 may fix a highlight location Y that is to be highlight-displayed, in accordance with formula (1).

Highlight location $Y$(distance from a reference point) =$H$(distance between the position fixing markers $M1$)÷(total number of rows of chart images 10)×((total number of rows of chart images 10)−(rows that has undergone the color measurement)) (1)

If H (distance between the position fixing markers M1) is 16 centimeters, the total number of rows of chart images 10 is 4, and the number of rows that has undergone the color measurement is 1, then, Y=16÷4×3=12. In this case, the image generating unit 112 highlight-displays the location spaced by about 12 centimeters from a reference 4B illustrated in FIG. 4B.

When the color measurement of the chart image 10 is performed, the chart paper sheet P may possibly be placed with the top side down.

For this reason in accordance with the exemplary embodiment, two position fixing markers M1 are formed on the chart paper sheet P to identify the top and bottom sides and the right and left edges as illustrated in FIG. 4B.

When the color measurement of the chart image 10 is performed, the highlight display may be placed at a wrong place if the top and bottom sides of the chart paper sheet P are not taken into account.

In accordance with the exemplary embodiment, the top and bottom sides of the chart paper sheet P are determined in response to the detection results of the position fixing marker M1, and the highlight display is placed in accordance with the determination results. In this way, placing the highlight display at a wrong place is controlled.

If the chart paper sheet P is placed with the upside down or is rotated, an alarm display alerting the user to the wrong direction of the chart paper sheet P may be displayed on the AR display apparatus 300.

By enclosing the chart image 10 within a rectangular fame, the location of the chart image 10 to be color-measured next is indicated. Alternatively, a message reading "Color measure the chart image 10 at the second row" may be used to indicate the location of the chart image 10 to be color-measured next. Alternatively, the chart image 10 at the second row may be labeled with an arrow mark to indicate the chart image 10 to be color-measured next.

Figure 5:
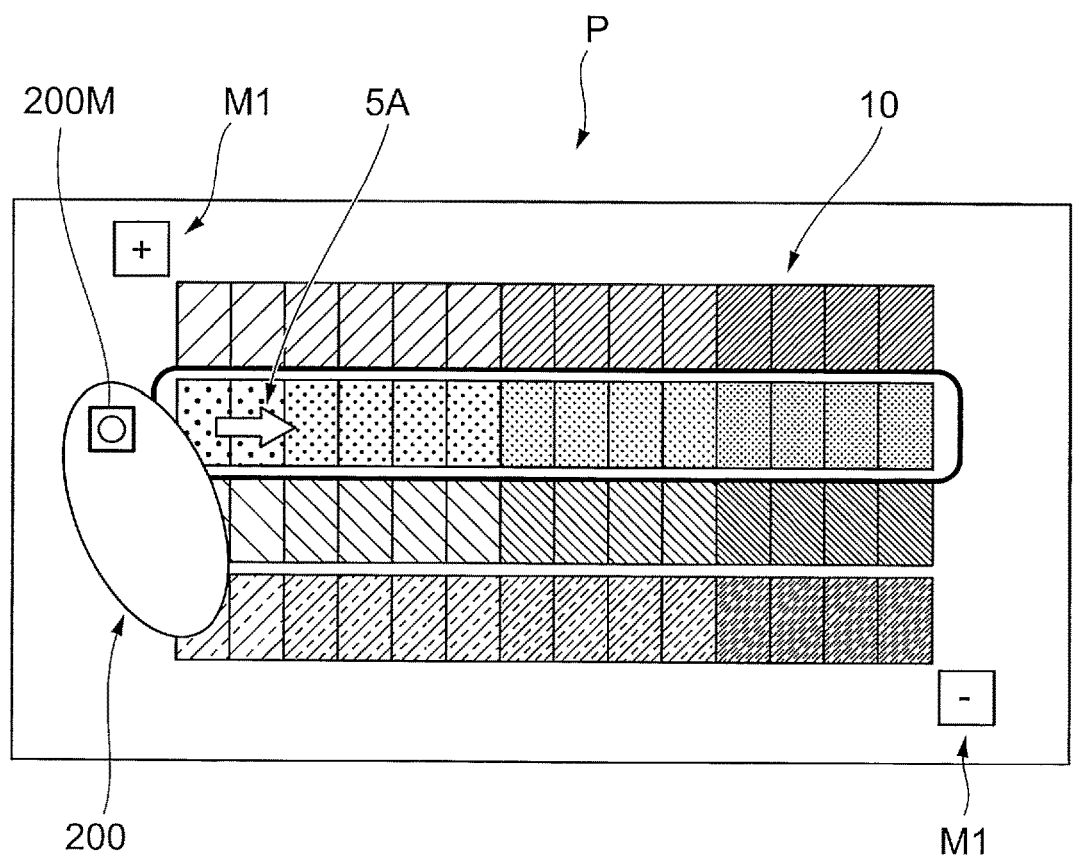
FIG. 5 illustrates a display example of the AR display apparatus when a color measurement unit is placed at the start end of a chart image at a second row.

FIG. 5 illustrates a display example of the AR display apparatus 300 when the color measurement unit 200 is placed at the start end of the chart image 10 at the second row.

The color measurement unit 200 includes a color measurement unit marker 200M to identify the color measurement unit 200. In accordance with the exemplary embodiment, the color measurement unit marker 200M is photographed by the camera 320 in the AR display apparatus 300 (see FIG. 1).

In accordance with the exemplary embodiment, the device control unit 111 (see FIG. 1) analyzes the results captured by the AR display apparatus 300, detects the color measurement unit marker 200M, and fixes the location of the color measurement unit 200.

More specifically, the device control unit 111 operating as a position fixing unit detects two locations, namely, the position fixing marker M1 and the color measurement unit marker 200M from the image captured by the camera 320, and fixes the location of the color measurement unit 200 on the chart paper sheet P.

In accordance with the exemplary embodiment, the device control unit 111 determines that the color measurement unit 200 is at the start end of the chart image 10 at the second row. When the user presses a start button (a start button (not illustrated) disposed in the AR display apparatus 300), the AR display apparatus 300 displays a display image labeled with an arrow mark 5A.

More specifically, when the color measurement unit 200 is determined to be at the start end of the chart image 10 at the second row in accordance with the exemplary embodiment, the image generating unit 112 (see FIG. 1) generates the display image including information indicating a movement direction and a movement speed of the color measurement unit 200. In other words, the image generating unit 112 generates the display image including information indicating an operation process of the color measurement unit 200.

The image output unit 113 outputs the display image to the AR display apparatus 300. The AR display apparatus 300 displays the display image.

In the display image of FIG. 5, the arrow faces rightward, and the user recognizes that the movement direction of the color measurement unit 200 is rightward. In other words, the user moves the color measurement unit 200 from the location of the chart image 10 at the second row in any direction. In accordance with the exemplary embodiment, the AR display apparatus 300 indicates that the movement direction of the color measurement unit 200 is rightward.

In the example of FIG. 5, the magnitude of the movement speed of the color measurement unit 200 is represented by the length of the arrow mark. By referencing the length of the arrow mark, the user recognizes the movement speed of the color measurement unit 200.

The user performs the color measurement process by moving the color measurement unit 200 rightward along the chart image 10 at the second row. In accordance with the exemplary embodiment, the color measurement process is performed on each row. Each time one row is color-measured, the device control unit 111 determines whether the color measurement process has been successful. The determination results are notified to the user via the AR display apparatus 300.

If the user is notified of an unsuccessful color measurement process, the color measurement process is performed again on the row that the user has determined to be unsuccessful.

The display example includes the movement direction and the movement speed of the color measurement unit 200. The display example may include only one of the movement direction and the movement speed.

The movement direction may be indicated by text information reading "Move the color measurement unit 200 rightward", for example.

The movement speed may also be text information reading "Move the color measurement unit 200 at a speed of 3 centimeters per second", for example.

Figure 6:
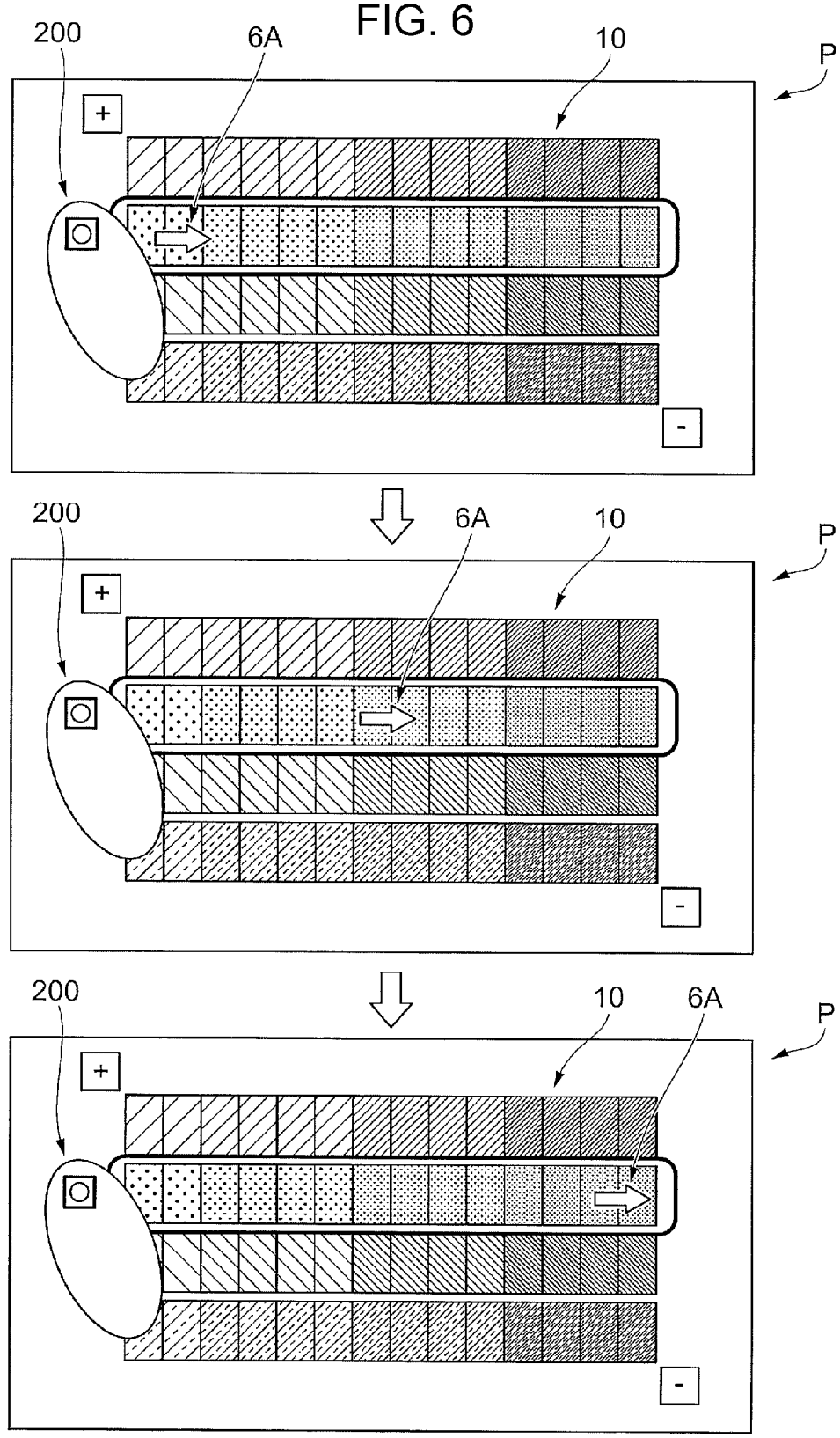
FIG. 6 illustrates other display examples on the AR display apparatus.

The movement speed is indicated by the length of the arrow mark. Alternatively, the movement speed of the color measurement unit 200 may be indicated by successively shifting the arrow mark (refer to an arrow mark 6A) as illustrated in FIG. 6 (the display example of the AR display apparatus 300).

Figure 7A:
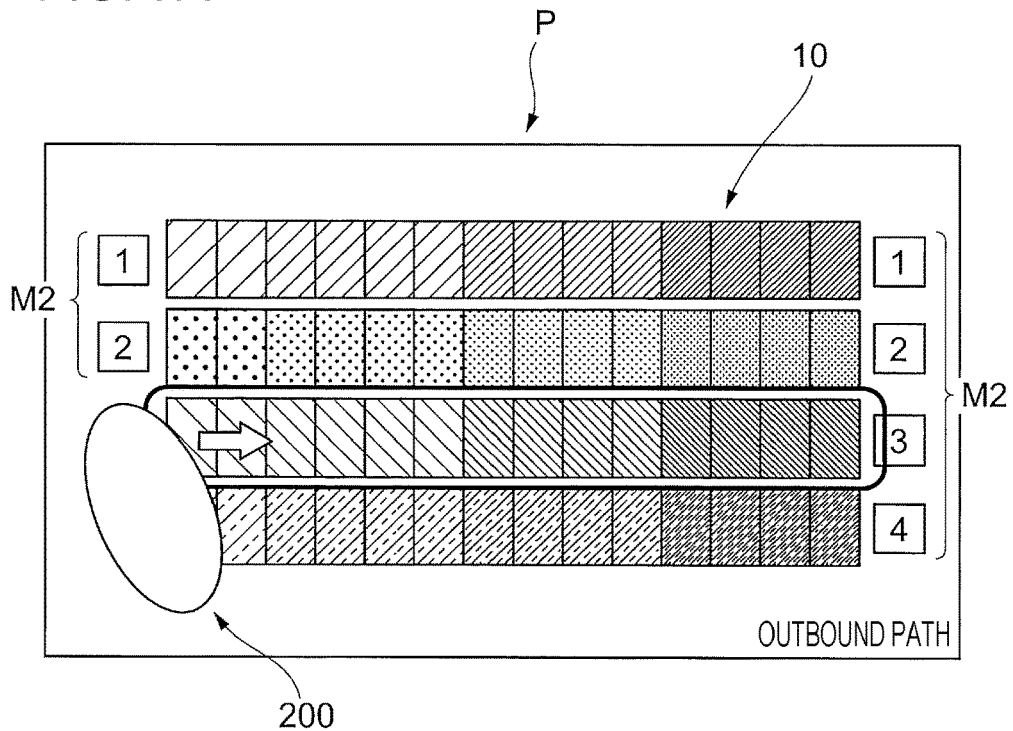
FIG. 7A and FIG. 7B illustrate other display examples on the AR display apparatus.
Figure 7B:
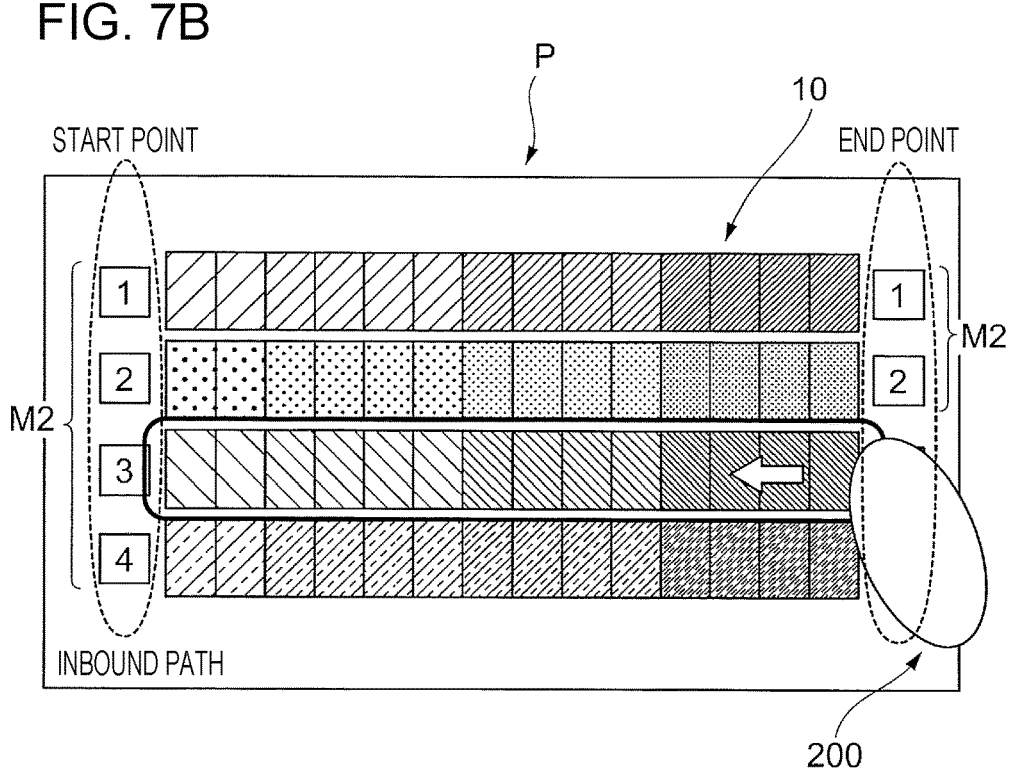

FIG. 7A and FIG. 7B illustrate other display examples of the AR display apparatus 300. In this example, a position fixing marker M2 is printed on the chart paper sheet P. More specifically, position fixing markers M2 are printed on both sides of each of the chart images 10.

If the color measurement unit 200 is placed at the start point of the chart image 10 at any row, the position fixing marker M2 at the start point is hidden behind the color measurement unit 200. With reference to FIG. 7A, the position fixing marker M2 at the start point of the chart image 10 at the third row is placed behind the color measurement unit 200, and the position fixing marker M2 corresponding to the chart image 10 at the third row is hidden. The device control unit 111 (see FIG. 1) determines that the color measurement unit 200 is placed at the start point of the chart image 10 at the third row.

If the chart image 10 at the third row is to be measured next, the arrow mark indicating the movement direction and movement speed of the color measurement unit 200 is displayed.

In this example, the color measurement unit 200 partially hides the chart paper sheet P. If the color measurement unit 200 moves, a portion of the chart paper sheet P hidden by the color measurement unit 200 changes.

In other words, when the color measurement unit 200 moves, the image captured by the camera 320 in the AR display apparatus 300 (the captured image of the chart paper sheet P) changes. In the process example of FIG. 7A and FIG. 7B, the location of the color measurement unit 200 is fixed in response to a change in the captured image.

In fixing the location of the color measurement unit 200, the number of detected position fixing markers M2 that are not hidden (the number of position fixing markers M2 detected from the captured image) is equal to a value (hereinafter referred to as a "difference value") that results from subtracting 1 from the total number of rows of the chart image 10, the color measurement unit 200 is determined to be placed at the hidden portion of the position fixing marker M2. If the detected number is not equal to the difference value, the color measurement unit 200 is determined to be undetected. In such a case, the fixing accuracy of the location of the color measurement unit 200 is increased.

In the example of FIG. 7A, multiple position fixing markers M2 of "3" and "4" are hidden, and the color measurement unit 200 is determined to be placed at the start point of the chart image 10 at the third or fourth row. In contrast, only when the detected number is equal to the difference value, the location of the color measurement unit 200 is fixed with one position fixing marker M2 hidden. The fixing accuracy of the location of the color measurement unit 200 is increased.

FIG. 7B illustrates the color measurement unit 200 that is placed at the end point of the chart image 10 at the third row.

When the color measurement unit 200 is placed at the end point of the chart image 10 at the position fixing marker M2 at the end point of the chart image 10 at the third row is hidden.

In a similar fashion as described above, the movement direction and movement speed of the color measurement unit 200 are displayed. More specifically, the arrow mark facing leftward is displayed.

More in detail, each chart image 10 is color-measured by causing the color measurement unit 200 to travel along an outbound path and an inbound path to color-measure the chart image 10.

More specifically, the color measurement unit 200 is moved from the start point to the end point of each chart image 10 (the color measurement unit 200 is moved along the inbound path) to color-measure the chart image 10. In accordance with the exemplary embodiment, the chart image 10 is highlight-displayed, and the movement direction and movement speed of the color measurement unit 200 are displayed as illustrated in FIG. 7A.

In accordance with the exemplary embodiment, the user moves the color measurement unit 200 from the end point to the start point of each chart image 10 (moves the color measurement unit 200 along an inbound path) to measure the color of the chart image 10.

In accordance with the exemplary embodiment, the chart image 10 is highlight-displayed, and the movement direction and movement speed of the color measurement unit 200 are displayed as illustrated in FIG. 7B.

When a display process of the AR display apparatus 300 is performed, the highlight display is presented not only when the color measurement unit 200 is moved along the outbound path but also when the color measurement unit 200 is moved along the inbound path.

Figure 8A:
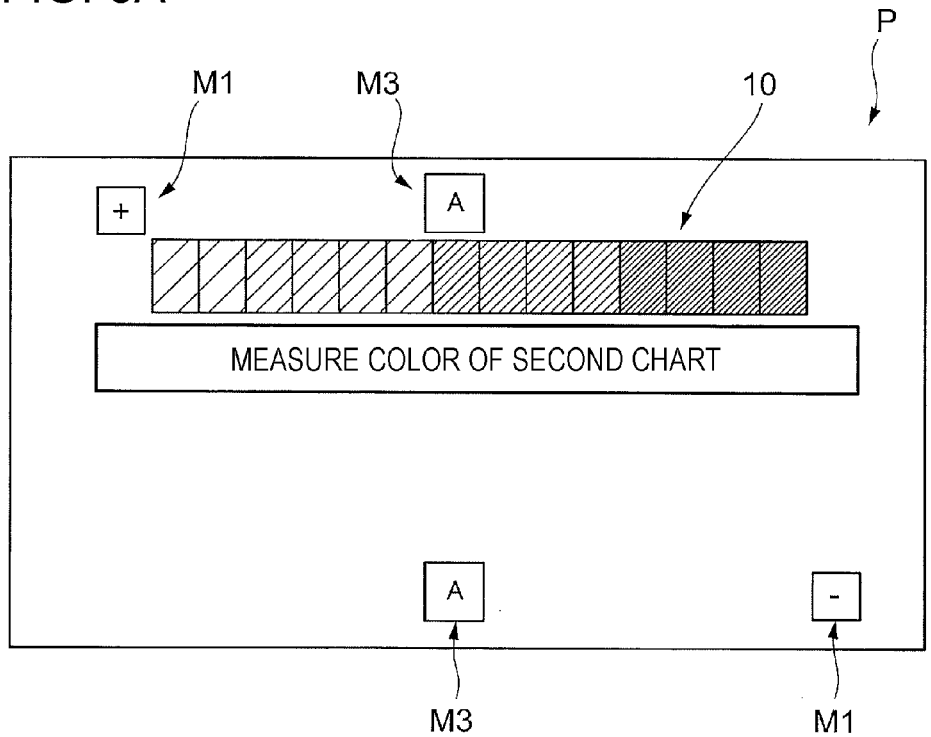
FIG. 8A and FIG. 8B illustrate other display examples on the AR display apparatus.
Figure 8B:
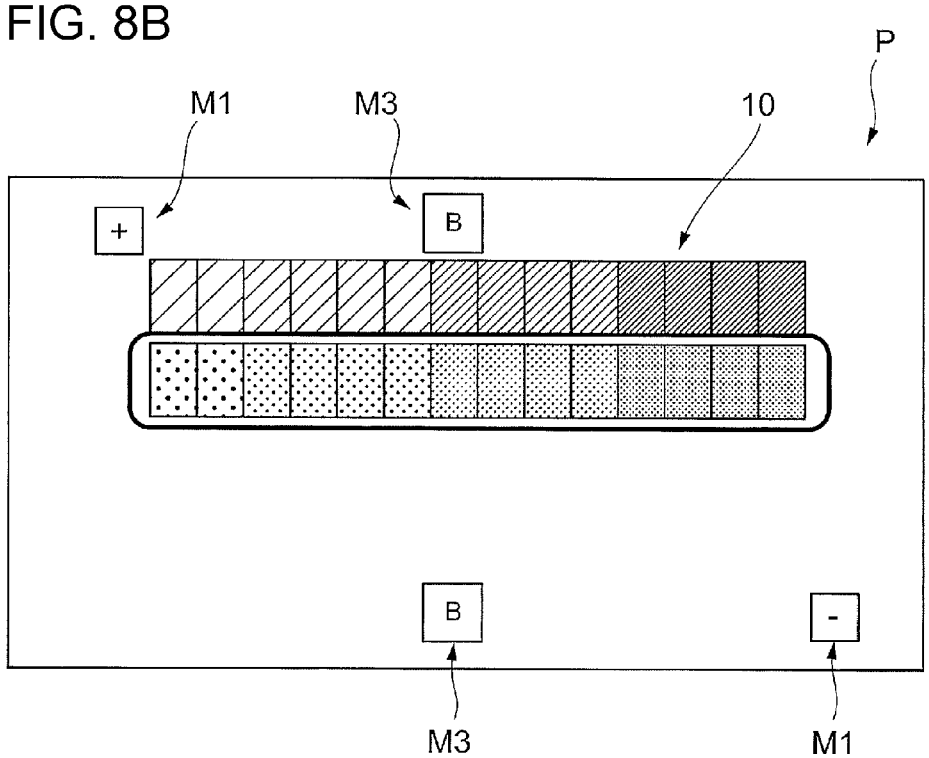

FIG. 8A and FIG. 8B illustrate other display examples of the AR display apparatus 300.

In these display examples, the chart image 10 is formed across multiple pages, page identification markers M3 are respectively printed at the top and bottom of each page to identify the page.

In accordance with the exemplary embodiment, the device control unit 111 (see FIG. 1) detects the page identification marker M3 from the image captured by the camera 320. The page number of each chart paper sheet P is thus recognized in accordance with the detected page identification marker M3.

In accordance with the exemplary embodiment, information indicating the page where the chart image 10 to be color-measured next is displayed on the AR display apparatus 300. For example, a message "Measure color of second chart" may be displayed as illustrated in FIG. 8A.

If the user views a second page through the AR display apparatus 300 as illustrated in FIG. 8B, the highlight display enclosing the chart image 10 is presented on the second page display image. In this way, the user learns which of the chart images 10 included on the second page is to be color-measured.

If the user views the chart paper sheet P on the first page (the chart paper sheet P that has undergone the color measurement), the AR display apparatus 300 indicates that the page is not a target of the color measurement. The user performs the color measurement on the chart image 10 formed on a page other than the first page.

In the above example, the text image is used to indicate the page where the chart image 10 to be color-measured is present. The page of the chart image 10 to be color-measured is not only indicated by the text image but also indicated by graphics, such as a downward looking arrow.

Figure 9A:
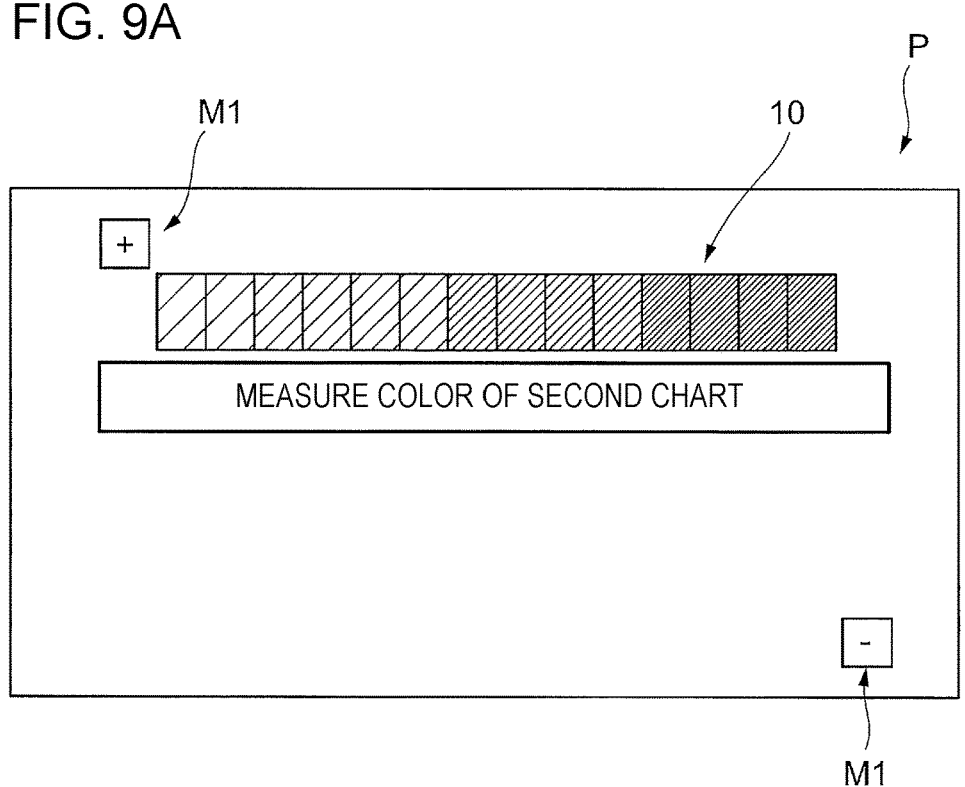
FIG. 9A and FIG. 9B illustrate other display examples on the AR display apparatus.
Figure 9B:
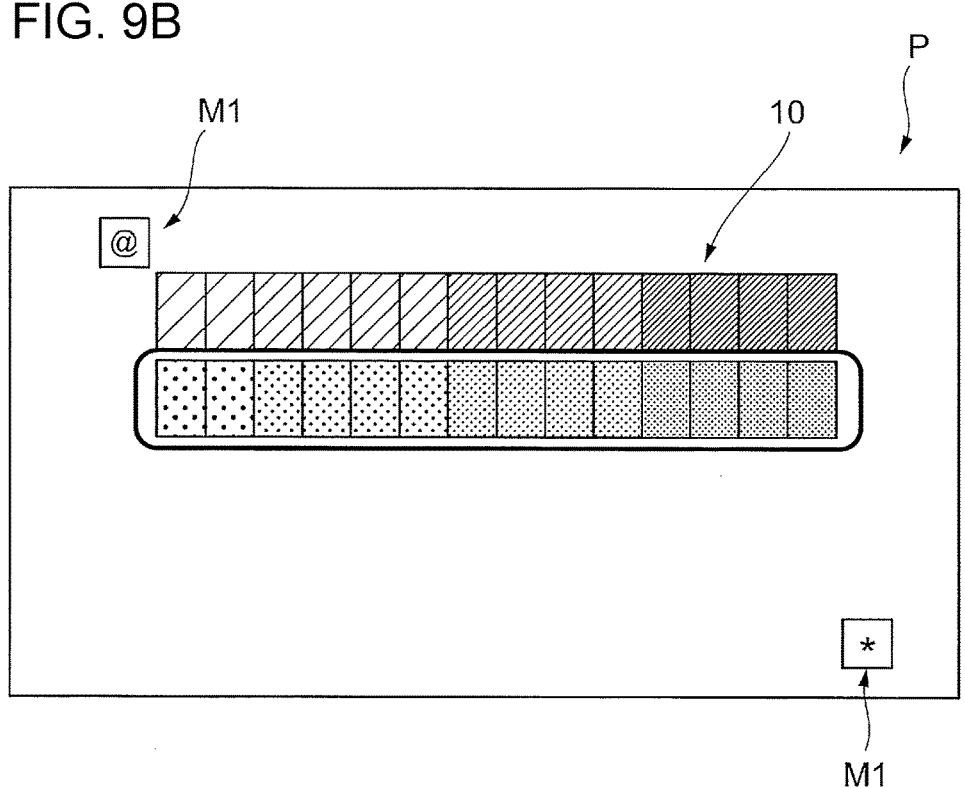

FIG. 9A and FIG. 9B illustrate other display examples of the AR display apparatus 300.

In this case, as well, the chart image 10 is formed across multiple pages. The color measurement process is to be performed on the chart image 10 on the second page.

The position fixing marker M1 is printed on each page, and the forms of the position fixing markers M1 are set to be different from each other. By reading the position fixing marker M1, each page is identified.

More specifically, when the image forming apparatus 400 discharges the chart paper sheet P, information indicating a correspondence relationship between the position fixing marker M1 of each page and the page number (hereinafter referred to as "correspondence relationship information") is generated. The correspondence relationship information is output to the device control unit 111 (see FIG. 1), and the device control unit 111 stores the correspondence relationship information.

Upon detecting the position fixing marker M1 from the captured image, the device control unit 111 references the correspondence relationship information to recognize the page number of the page where the position fixing marker M1 is placed.

In the process examples of FIG. 8A and FIG. 8B, the page number of each page is learned by attaching to the page identification marker M3 an identification for page and then by analyzing the page identification marker M3. In contrast, in the process examples of FIG. 9A and FIG. 9B, the page number of each page is learned by referencing the correspondence relationship information without attaching to the position fixing marker M1 an identification for page.

If the page the user views through the AR display apparatus 300 is not a target page (a page that has undergone the color measurement) in the process examples of FIG. 9A and FIG. 9B, information indicating the page where the chart image 10 to be color-measured is displayed on the AR display apparatus 300 as illustrated in FIG. 9A.

Similarly, if the user views through the AR display apparatus 300 the page where the chart image 10 to be color-measured is placed, the highlight display is presented to indicate the location of the chart image 10 as illustrated in FIG. 9B. The movement direction and movement speed of the color measurement unit 200 are also displayed, though they are not illustrated.

In accordance with the exemplary embodiment, if the color measurement unit 200 is to be calibrated, the AR display apparatus 300 displays an indication that the color measurement unit 200 is to be calibrated. More specifically, the AR display apparatus 300 displays the indication that the color measurement unit 200 is to be calibrated each time a predetermined time period has elapsed or each time a predetermined number of color measurement processes has been completed.

The user may move the color measurement unit 200 to a calibrator (not illustrated), and calibrate the color measurement unit 200 using the calibrator. The color measurement accuracy is thus maintained by the color measurement unit 200.

The related art concerning information display to the user is described.

The information display to the user may be performed by displaying information on a fixed-type display. In this case, user friendliness is typically lower than in a portable-type display.

Depending on jobs to be performed by the user, the user has difficulty in performing some jobs while viewing the display at the same time. The fixed-type display thus inconveniences the user.

The information display to the user may be presented in abstract graphics. In this case, since uniform information is typically provided to the user, user-friendly information is difficult to be conveyed to the user.

The abstract graphics are also difficult for the user to intuitively understand the contents of the job, and the operability of the operation by the user tends to decrease.

In the color measurement process of the exemplary embodiment, information is displayed on the fixed-type display to present the job operation process to the user.

However, the color measurement process includes a job that is difficult for the user to perform while viewing the display, for example, while moving the color measurement unit 200 along the chart image 10. If the fixed-type display is used, the job operability of the operation by the user is likely to decrease.

If the fixed-type display is used, the user alternates between operating the color measurement unit 200 and checking the display in order to perform the color measurement process and the verification job of the color measurement results.

In such a case, the user is forced to look away from the chart image 10, and may lose track of the chart image 10 to be color-measured next when a next color measurement process is performed.

It is also contemplated that the abstract graphics are used to operate the color measurement unit 200. However, since the job procedure of the color measurement process is complex, the displaying of the abstract graphics may be considered too simple to convey the complex operation process of the color measurement unit 200 to the user.

Figure 10:
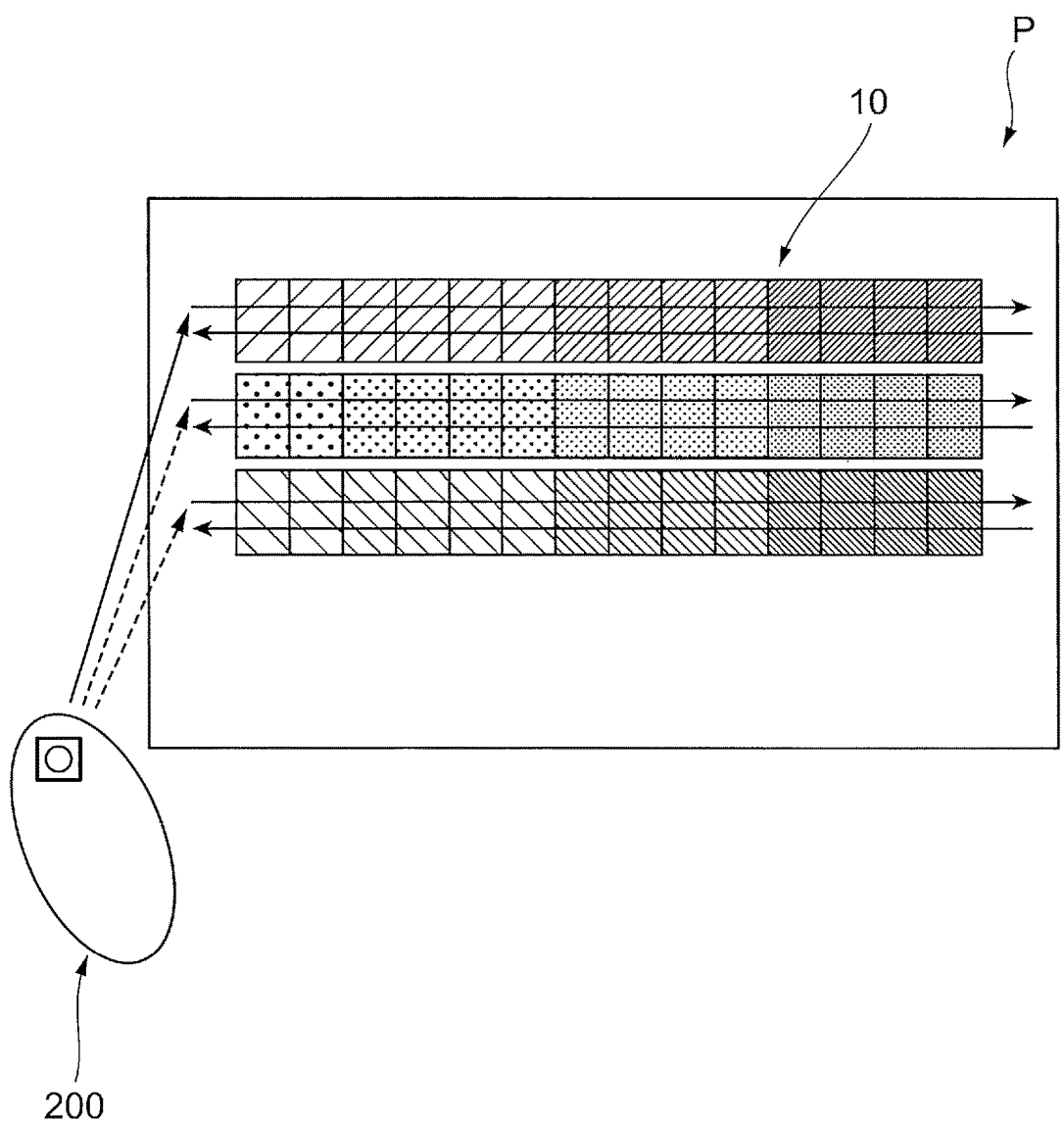
FIG. 10 illustrates a typical color measurement process of related art.

FIG. 10 illustrates a typical color measurement process of related art.

Similarly in the color measurement process of the related art, the color measurement process is performed on each chart image 10 by moving the color measurement unit 200 along the outbound path and inbound path.

In the color measurement process of the related art, the job is performed by viewing the fixed-type display (not illustrated). More specifically, the user alternates between performing the color measurement process using the color measurement unit 200 and checking the results on the display. In such a case, the user momentarily looks away from the chart image 10 and may lose track of the chart image 10 to be color-measured next.

In the color measurement process using the color measurement unit 200, the color measurement unit 200 is typically moved at a predetermined speed in a predetermined direction. In the related art color measurement process, no commands in speed and direction are issued, and the user has difficulty in recognizing the speed and direction of the color measurement unit 200.

The movement speed of the color measurement unit 200 may vary to be lower or higher than a planned speed, possibly leading to failure to perform stable color measurement.

In contrast, in accordance with the exemplary embodiment, information is displayed on the portable-type AR display apparatus 300. The display apparatus is thus placed close to a location where the color measurement process is performed. Job efficiency is thus increased in comparison with the case in which the fixed-type display is used.

Particularly, in the case of a head-mount AR display apparatus 300 (the AR display apparatus 300 worn by the user), the user is free from aligning his or her vision to the AR display apparatus 300 and the job efficiency is increased.

In accordance with the exemplary embodiment, the information displayed on the AR display apparatus 300 is not ordinary graphics but a display matching the contents of the actual job of the user.

In other words, in accordance with the exemplary embodiment, the display contents are successively switched in response to the job contents of the user. The user may thus easily learn the operation to be performed, and user friendliness is increased.

In the color measurement process of the related art, the timing when the color measurement unit 200 is to be calibrated is difficult to determine.

In the color measurement process using the color measurement unit 200, the color measurement unit 200 is calibrated at predetermined time intervals. In accordance with the color measurement process of the related art, the calibration timing is not displayed, and the user has difficulty in learning the calibration timing. In accordance with the color measurement process of the related art, one of causes leading to an error in the color measurement process may be an unexecuted calibration. If the timing of calibration is notified, the occurrence of a color measurement error caused by the unexecuted calibration is controlled.

In accordance with the exemplary embodiment, the AR display apparatus 300 is placed close to the user. If information concerning the calibration is also displayed on the AR display apparatus 300, the user may learn the timing when the calibration is to be performed. The color measurement error caused by the unexecuted calibration is thus controlled.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color measurement system comprising:
   a display that presents to a user an augmented reality space that results from combining a display image into a real space; and
   an image generating unit that generates the display image that is obtained when the user views through the display a medium having thereon a color measurement target image on which color measurement is to be performed, the display image including information indicating a location of the color measurement target image, wherein
   two position fixing markers are formed on the medium to identify top and bottom sides and right and left edges of the medium, and
   the location of the color measurement target image is highlighted on the display image based on a distance between the two position fixing markers and a total number of rows of the display image that has undergone the color measurement.

2. The color measurement system according to claim 1, wherein the image generating unit generates the display image that includes information indicating a movement direction and/or a movement speed of a color measurement unit that measures a color of the color measurement target image when the user moves the color measurement unit.

3. The color measurement system according to claim 1, wherein the color measurement target image is present across a plurality of pages, and
wherein the image generating unit generates the display image that includes information indicating a page where the color measurement target image is placed.

4. The color measurement system according to claim 2, wherein the color measurement target image is present across a plurality of pages, and
wherein the image generating unit generates the display image that includes information indicating a page where the color measurement target image is placed.

5. The color measurement system according to claim 1 further comprising:
a position fixing unit that fixes the location of the color measurement unit that measures the color of the color measurement target image.

6. The color measurement system according to claim 2 further comprising:
a position fixing unit that fixes the location of the color measurement unit that measures the color of the color measurement target image.

7. The color measurement system according to claim 3 further comprising:
a position fixing unit that fixes the location of the color measurement unit that measures the color of the color measurement target image.

8. The color measurement system according to claim 4 further comprising:
a position fixing unit that fixes the location of the color measurement unit that measures the color of the color measurement target image.

9. The color measurement system according to claim 5, wherein the display comprises an imaging unit that captures an image, and
wherein the position fixing unit detects the color measurement unit in the image captured by the imaging unit in the display, and fixes the location of the color measurement unit.

10. The color measurement system according to claim 6, wherein the display comprises an imaging unit that captures an image, and
wherein the position fixing unit detects the color measurement unit in the image captured by the imaging unit in the display, and fixes the location of the color measurement unit.

11. The color measurement system according to claim 7, wherein the display comprises an imaging unit that captures an image, and
wherein the position fixing unit detects the color measurement unit in the image captured by the imaging unit in the display, and fixes the location of the color measurement unit.

12. The color measurement system according to claim 8, wherein the display comprises an imaging unit that captures an image, and
wherein the position fixing unit detects the color measurement unit in the image captured by the imaging unit in the display, and fixes the location of the color measurement unit.

13. The color measurement system according to claim 5, wherein the display comprises an imaging unit that captures an image, and
wherein the position fixing unit fixes the location of the color measurement unit in response to a change in the captured image of the medium acquired by the display.

14. The color measurement system according to claim 6, wherein the display comprises an imaging unit that captures an image, and
wherein the position fixing unit fixes the location of the color measurement unit in response to a change in the captured image of the medium acquired by the display.

15. A color measurement system comprising:
a display that presents to a user an augmented reality space that results from combining a display image into a real space; and
an image generating unit that generates the display image that is obtained when the user views through the display a medium having thereon a color measurement target image on which a color measurement unit performs color measurement, the display image including information indicating an operation process of the color measurement unit, wherein
two position fixing markers are formed on the medium to identify top and bottom sides and right and left edges of the medium, and
a location of the color measurement target image is highlighted on the display image based on a distance between the two position fixing markers and a total number of rows of the display image that has undergone the color measurement.

16. The color measurement system according to claim 15, wherein the image generating unit generates the display image that includes information indicating a movement direction and/or a movement speed of the color measurement unit that measures a color of the color measurement target image when the user moves the color measurement unit.

17. An image generating apparatus comprising:
an image generating unit that generates a display image that is displayed on a display that presents to a user an augmented reality space that results from combining the display image into a real space, wherein if the user views through the display a medium having thereon a color measurement target image on which color measurement is performed, the image generating unit generates the display image including information indicating a location of the color measurement target image, wherein
two position fixing markers are formed on the medium to identify top and bottom sides and right and left edges of the medium, and
the location of the color measurement target image is highlighted on the display image based on a distance between the two position fixing markers and a total number of rows of the display image that has undergone the color measurement; and
an output unit that outputs to the display the display image generated by the image generating unit.

18. An image generating apparatus comprising:
an image generating unit that generates a display image that is displayed on a display that presents to a user an augmented reality space that results from combining the display image into a real space, wherein if the user views through the display a medium having thereon a color measurement target image on which a color measurement unit performs color measurement, the image generating unit generates the display image including information indicating an operation process of the color measurement unit, wherein two position fixing markers are formed on the medium to identify top and bottom sides and right and left edges of the medium, and a location of the color measurement target image is highlighted on the display image based on a distance between the two position fixing markers and a total number of rows of the display image that has undergone the color measurement; and an output unit that outputs to the display the display image generated by the image generating unit.

19. A non-transitory computer readable medium storing a program causing a computer to execute a process for forming an image, the process comprising:

generating a display image that is displayed on a display that presents to a user an augmented reality space that results from combining the display image into a real space, and if the user views through the display a medium having thereon a color measurement target image on which color measurement is performed, generating the display image including information indicating a location of the color measurement target image, wherein two position fixing markers are formed on the medium to identify top and bottom sides and right and left edges of the medium, and the location of the color measurement target image is highlighted on the display image based on a distance between the two position fixing markers and a total number of rows of the display image that has undergone the color measurement; and outputting to the display the generated display image.

20. A non-transitory computer readable medium storing a program causing a computer to execute a process for forming an image, the process comprising:

generating a display image that is displayed on a display that presents to a user an augmented reality space that results from combining the display image into a real space, and if the user views through the display a medium having thereon a color measurement target image on which a color measurement unit performs color measurement, generating the display image including information indicating an operation process of the color measurement unit, wherein two position fixing markers are formed on the medium to identify top and bottom sides and right and left edges of the medium, and the location of the color measurement target image is highlighted on the display image based on a distance between the two position fixing markers and a total number of rows of the display image that has undergone the color measurement; and outputting to the display the generated display image.

* * * * *